Sept. 1, 1925.

J. B. BIRGH

ROLLER BEARING

Filed March 5, 1923

Inventor:
John B. Birgh.

Patented Sept. 1, 1925.

1,552,031

UNITED STATES PATENT OFFICE.

JOHN B. BIRGH, OF CHICAGO, ILLINOIS.

ROLLER BEARING.

Application filed March 5, 1923. Serial No. 622,850.

*To all whom it may concern:*

Be it known that I, JOHN B. BIRGH, a subject of the King of Sweden, residing at Chicago, in the county of Cook and State of Illinois, have invented certain new and useful Improvements in Roller Bearings, of which the following is a specification.

This invention relates, generally, to improvements in anti-friction bearings, but has particular relation to the roller bearing type or class of such bearings, and consists in certain novel features and peculiarities in the construction, arrangement and combination of the various elements or parts thereof, as will be hereinafter more fully set forth and specifically claimed.

An important object of the present invention, is the provision of a roller bearing in which the parts thereof are so made, arranged and co-operating with one another as to enable them to be operatively assembled in a much shorter time and more readily than has heretofore been generally accomplished.

Another object is to provide a roller bearing of high efficiency in performing the functions of anti-friction roller bearings heretofore in general use, and in addition thereto, to afford means whereby load carrying rollers only are employed in connection with the retaining members thereof, the usual spacing rollers being dispensed with.

A still further object of the invention is the provision of means to take care of or carry side thrusts of the parts and to reduce to a minimum noise incident to the operation of the various parts of the bearing.

Furthermore, the invention contemplates the provision of a bearing in which the rollers thereof will have uniform and simultaneous bodily as well as individual movements.

Other objects and advantages of the invention will become apparent from the following description and explanation.

In the accompanying drawing, which serves to illustrate an embodiment of the invention, Fig. 1 is a face view partly in elevation and partly in section of the bearing, showing the parts thereof in their operative positions.

Corresponding numerals of reference refer to like parts throughout the different views of the drawing.

Figure 3:
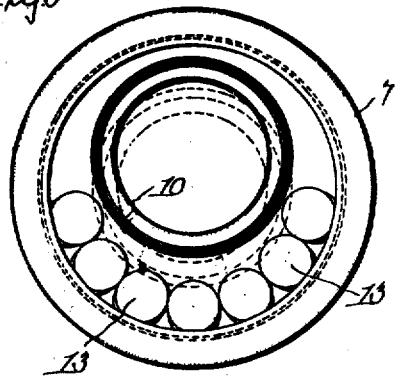
Fig. 3 is a side view of the bearing with the keeper rings for the rollers removed, showing by continuous lines the position of the parts in the first step of assembling the same and by dotted lines the second or following step in said operation.
Figure 1:
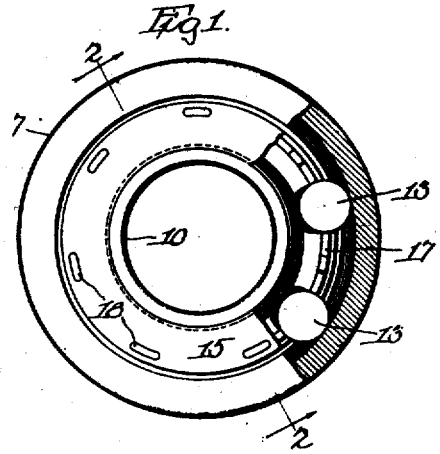

The reference numeral 7 designates the outer retaining member or ring of the bearing, which may be made of any suitable size and material, but is preferably made in the form of a ring, although if desired, it may have its outer portion of other shape than circular. The inner surface or periphery of the ring 7 is inclined from each of its edges toward the outer surface of the ring but said inclined portions terminate at their inner ends short of the medial line between the edges of the ring 7 as is clearly shown in Figs. 2 and 4 of the drawings. Between the inner ends of the said inclined portions the ring 7 is provided with an annular inwardly extended rib 8 which has its sides outwardly inclined and by preference at an obtuse angle to each other. By this arrangement or construction it is obvious that the ring 7 will have on each side of the rib 8 thereof an annular groove 9, the walls of which unite the inner ends of the portions inclined from the edges of the ring 7 with the outer ends of the inclined walls of the rib 8 of said ring.

The inner retaining member or ring of the bearing is indicated by the numeral 10 and may be made of any suitable size, but by preference of the same width as the outer ring 7, and is normally concentrically located in said outer ring but spaced therefrom. The inner ring 10 which may be suitably mounted on a journal or axle, has its outer periphery inclined outwardly from its medial line between its edges to points near its edges, at which points the ring 10 is provided with peripheral recesses 11 each having an annular shoulder 12 disposed at right angles to the floors of said recesses.

Figure 4:
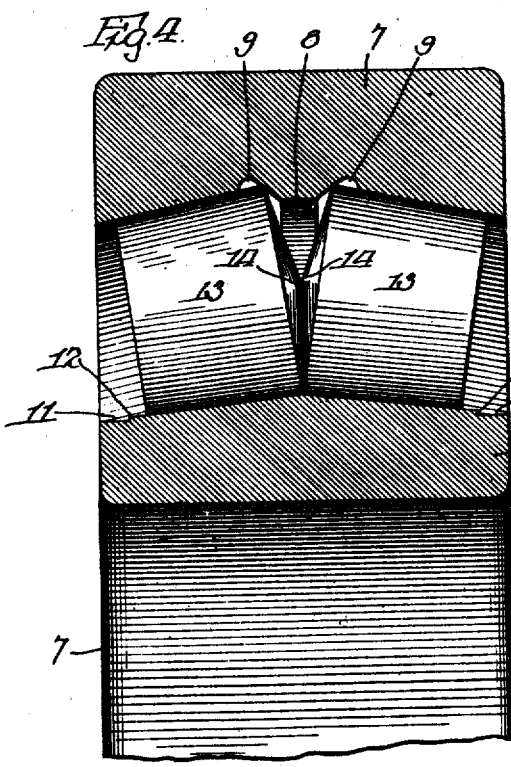
Fig. 4 is an enlarged fragmental sectional view similar to that shown in Fig. 2 and taken on the same line but with the roller keeper rings omitted.

From the foregoing and by reference particularly to Fig. 4 of the drawing, it will be understood and seen that while the inclined portions leading from the edges of the outer ring 7 and the inclined portions leading from the medial line of the ring 10 are inclined in the same direction, yet it will be understood that the inclination of said parts are not located in parallel planes, but are so disposed that the space between the coinciding inclined portions of the inner and outer rings are wider near the inner portions of said inclined walls than at their outer ends.

Figure 2:
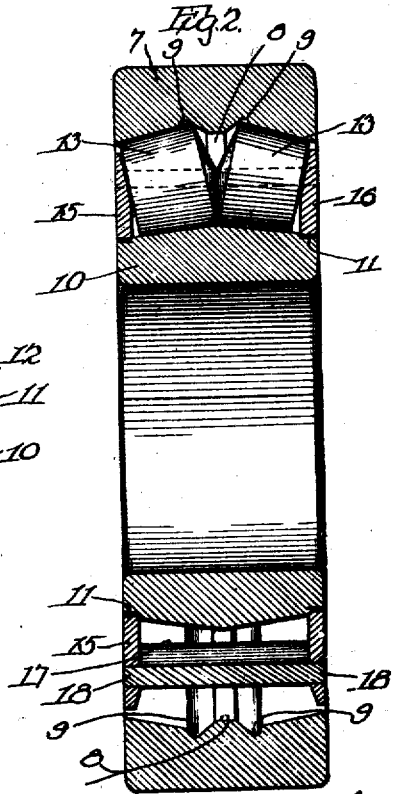
Fig. 2 is a greatly enlarged sectional view taken on line 2—2 of Fig. 1 looking in the direction indicated by the arrows.

By this arrangement an annular space having outwardly inclined and slightly contracted walls is provided, in which a plurality of anti-friction rollers 13 are located in a pair of rows as will be readily understood by reference to Fig. 2 of the drawing. Each of these rollers by preference has its inner end cone-shaped as at 14, and its opposite end diametrical. Each of the rollers 13 is tapered from its inner portion or end to its outer end to correspond with the tapered space between the outer retaining ring 7 and the inner retaining ring 10 between which the rollers are located. A pair of keeper rings 15 and 16 of a size to fit between the outer retaining ring 7 and the inner retaining ring 10, preferably, without contacting with the former as will be understood by reference to Fig. 2 of the drawing, are employed to fit loosely at their inner edges in the recesses 11 of the retaining ring 10 and against the shoulders 12 thereof for the purpose of assisting in holding the rollers 13 in spaced relation. The keeper rings 15 and 16 are united and held in spaced relation at the edges of the retaining rings 7 and 10 between which they are located as above stated, by means of a number of bars 17 which are by preference secured by means of riveting them at each of their ends in openings as at 18, see Fig. 2, after the rollers 13 have been properly spaced and said bars have been placed one between each pair of said rollers.

In order to assemble the parts of the bearing, the outer retaining member or ring 7 may be placed in about the position shown in Fig. 3 of the drawing, when a plurality of the load carrying rollers 13 may be placed in a pair of rows on the inner surface of the said retaining ring with their conical ends of each pair of rollers in contact with one another and with their inner peripheral ends or edges in contact with the inclined walls of the rib 8 of said retaining ring. The arrangement of the rollers in the first step of assembling the parts, is shown in Fig. 3 of the drawing, in which view it will be seen and understood that the inner retaining ring or member 10 is then placed eccentrically within the outer retaining ring 7 as shown by continuous lines in said figure, when by causing the inner ring 10 to assume the dotted line position shown in Fig. 3, it is manifest that the rollers 13 can be moved between the inner and outer retaining members and properly spaced. When the rollers are thus arranged, the bars 17 which perform the functions of spacing the rollers, as well as that of uniting the keeper rings, are then extended between the spaced rollers 13, when by inserting the keeper rings 15 and 16 between the retaining rings 7 and 10 at each edge thereof, the ends of the bars 17 may be caused to enter the openings in the keeper rings where said ends may be clinched or riveted, thus effectually holding the bearing rollers in spaced relation and in transversely disposed pairs.

When the parts are thus assembled, it is apparent that by reason of the novel and peculiar construction of the adjacent surfaces of the inner and outer retaining members and of the rollers, as well as by reason of the cross-sectionally angular rib midway between the edges of the outer retaining ring, side thrusts of the parts will be properly taken care of and that as the rollers 13 contact with or travel on the inclined adjacent surfaces of the inner and outer retaining members as well as against the inclined walls of the annular rib of the outer retaining member, a noiseless, efficient, and substantially frictionless bearing will be afforded, in which the entire number of rollers will have a uniform movement as well as individual or independent movement.

By providing the outer retaining ring 7 with the annular rib 8 midway between the edges of said ring, and by providing said rib with its side walls disposed at angles to one another as well as at angles to the inclined portions of the inner periphery of the ring 7, it is manifest that the when the rollers 13 are placed in the positions shown in Figs. 3 and 4 of the drawing, the edges only of the inner peripheral portions of the said rollers will contact with the walls of the rib, thereby providing stops to prevent the rollers from either side of the rib being extended too far towards the other side of the rib and also by this arrangement it is obvious that friction will be reduced to a minimum incident to the contact between the inner peripheral edges of the rollers and the walls of the rib, thereby preventing heating of the parts. The peculiar construction and relation of the rib with respect to the inclined inner portions of the ring 7 further provides means by which the inner surface of the ring 7 can be ground when necessary, without disarranging the relation of the inclined parts of the inner periphery of the ring 7 with respect to the angular walls of the rib 8, for it is apparent that the grooves 9 will receive the grinding tool in the operation of grinding the surface of said ring.

Having thus fully described my invention, what I claim as new and desire to secure by Letters Patent is—

In a roller bearing, the combination with an outer retaining ring having its inner periphery outwardly inclined from its edges to points near each side of its medial line between said edges and provided on said line with an inwardly extending annular rib having inclined side walls, of a plurality of oppositely tapered rollers located on the inner surface of said ring in pairs, said rollers having cone-shaped ends at the larger portions thereof, and an inner retaining ring having its outer periphery outwardly inclined in such manner with relation to the inclined portions upon said outer ring and said annular rib so that the cone-shaped ends of each pair of rollers are held in contact with each other upon one side of the apices of said cones and edge contact with the rib upon the opposite side of said apices.

JOHN B. BIRGH.

In a roller bearing, the combination with an outer retaining ring having its inner periphery outwardly inclined from its edges to points near each side of its medial line between said edges and provided on said line with an inwardly extending annular rib having inclined side walls, of a plurality of oppositely tapered rollers located on the inner surface of said ring in pairs, said rollers having cone-shaped ends at the larger portions thereof, and an inner retaining ring having its outer periphery outwardly inclined in such manner with relation to the inclined portions upon said outer ring and said annular rib so that the cone-shaped ends of each pair of rollers are held in contact with each other upon one side of the apices of said cones and edge contact with the rib upon the opposite side of said apices.

JOHN B. BIRGH.

CERTIFICATE OF CORRECTION.

Patent No. 1,552,031.  Granted September 1, 1925, to

JOHN B. BIRGn.

It is hereby certified that the above numbered patent was erroneously issued to the inventor said "Birgh", whereas said patent should have been issued to "Twin Bearing Company", of Chicago, Illinois, a corporation of Illinois, said corporation being assignee of the entire interest in said invention, as shown by the records of assignments in this office; and that the said Letters Patent should be read with this correction therein that the same may conform to the record of the case in the Patent Office.

Signed and sealed this 4th day of October, A. D. 1927.

Seal.

M. J. Moore,
Acting Commissioner of Patents.

CERTIFICATE OF CORRECTION.

Patent No. 1,552,031.                              Granted September 1, 1925, to

JOHN B. BIRGH.

It is hereby certified that the above numbered patent was erroneously issued to the inventor said "Birgh", whereas said patent should have been issued to "Twin Bearing Company", of Chicago, Illinois, a corporation of Illinois, said corporation being assignee of the entire interest in said invention, as shown by the records of assignments in this office; and that the said Letters Patent should be read with this correction therein that the same may conform to the record of the case in the Patent Office.
Signed and sealed this 4th day of October, A. D. 1927.

Seal.                                                        M. J. Moore,
                                                                Acting Commissioner of Patents.